(No Model.)

6 Sheets—Sheet 3.

N. W. HOLT.
SEPARATING MACHINE.

No. 422,785.

Patented Mar. 4, 1890.

Witnesses:
J. B. McGinn.
Marcus B. May

Inventor:
Noah W. Holt
by Doubleday & Bliss atty.

(No Model.) 6 Sheets—Sheet 4.
N. W. HOLT.
SEPARATING MACHINE.
No. 422,785. Patented Mar. 4, 1890.
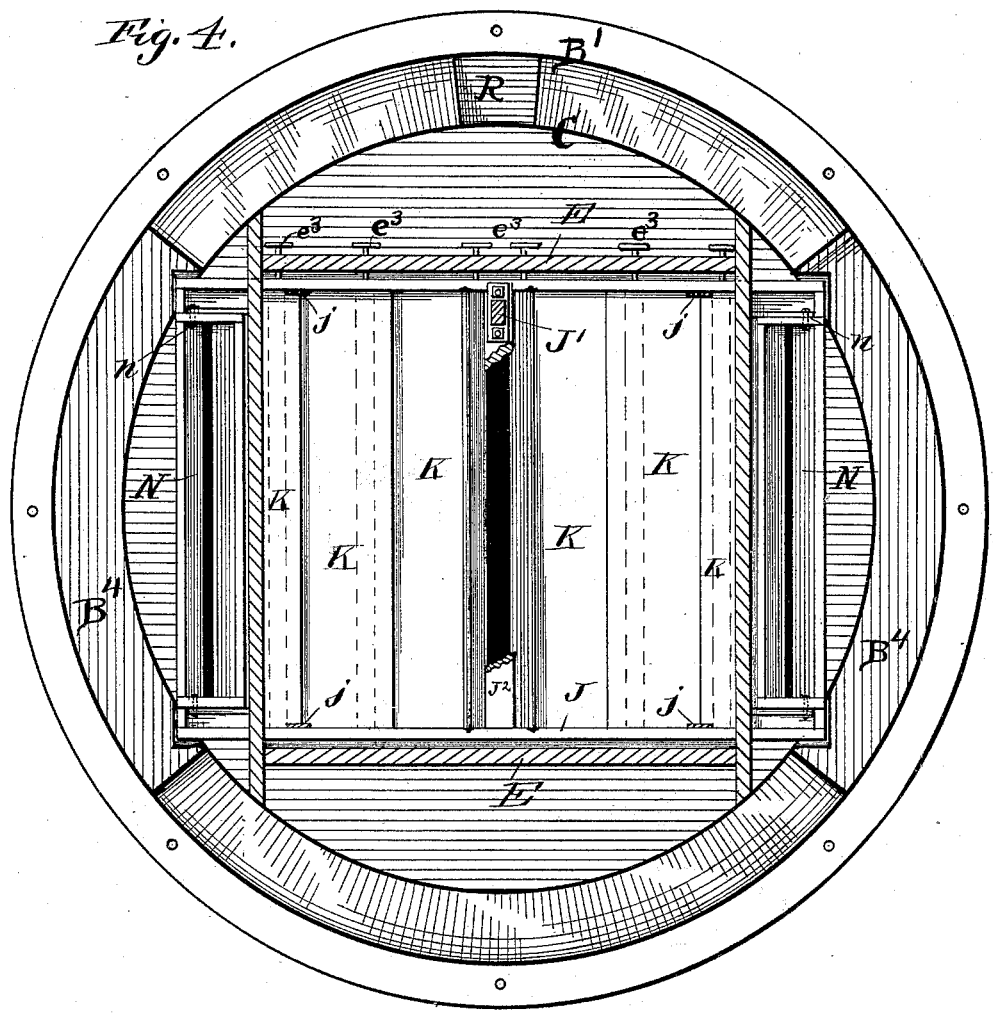
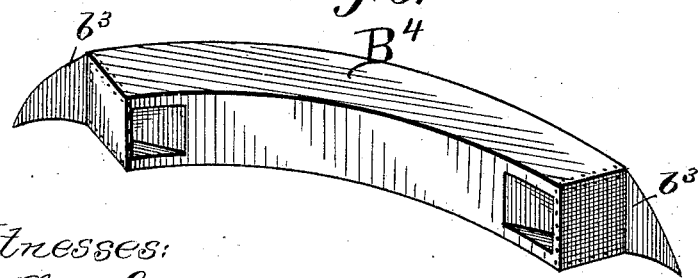

(No Model.)  6 Sheets—Sheet 5.

N. W. HOLT.
SEPARATING MACHINE.

No. 422,785.   Patented Mar. 4, 1890.

Witnesses:
J. B. McGirr.
Marcus P. May.

Inventor:
Noah W. Holt
by Dombledon & Bliss att'y.

(No Model.) 6 Sheets—Sheet 6.
N. W. HOLT.
SEPARATING MACHINE.
No. 422,785. Patented Mar. 4, 1890.
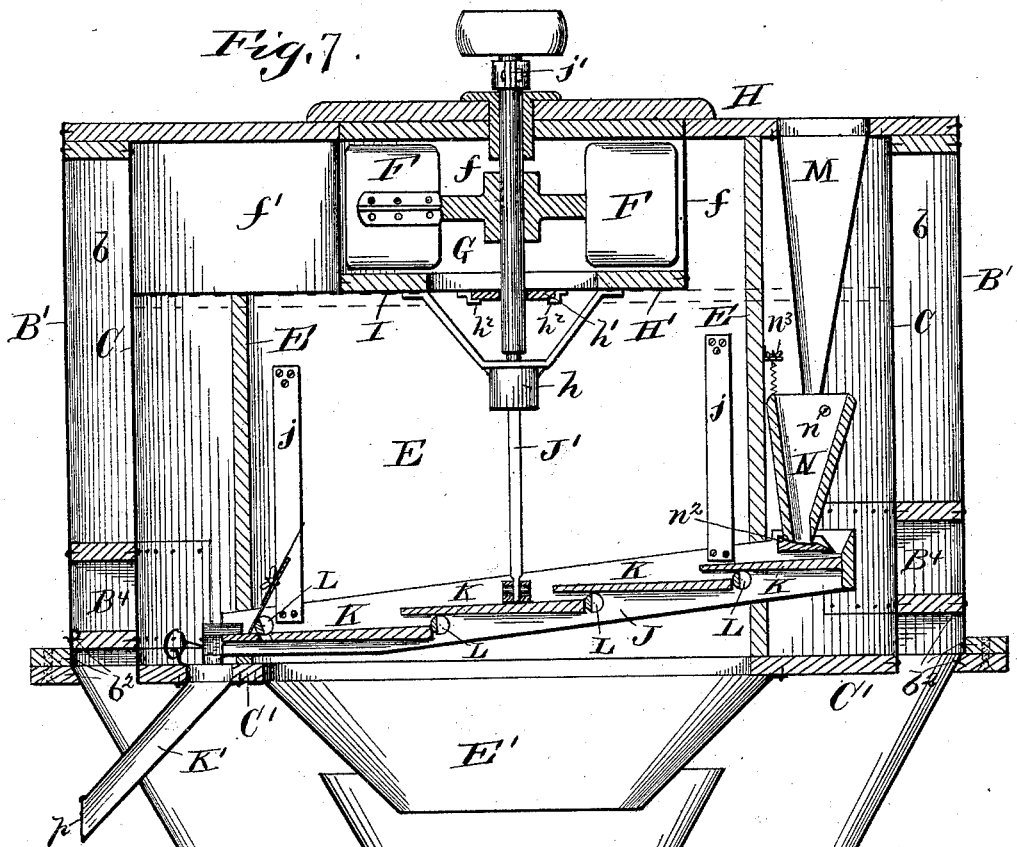
Fig. 7.
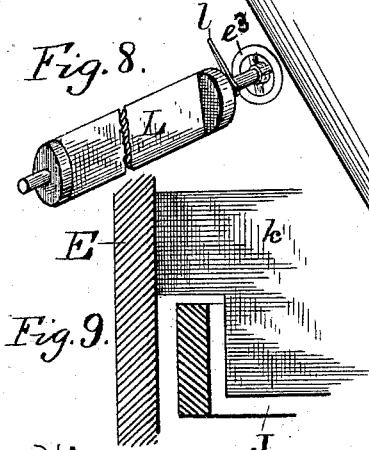
Fig. 8.
Fig. 9.
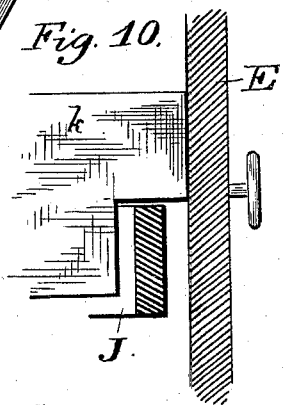
Fig. 10.
Witnesses.
Inventor,
Noah W. Holt
by Doubleday & Bliss, Attys.

UNITED STATES PATENT OFFICE.

NOAH W. HOLT, OF MANCHESTER, MICHIGAN.

SEPARATING-MACHINE.

SPECIFICATION forming part of Letters Patent No. 422,785, dated March 4, 1890.

Application filed April 2, 1889. Serial No. 305,716. (No model.)

*To all whom it may concern:*

Be it known that I, NOAH W. HOLT, a citizen of the United States, residing at Manchester, in the county of Washtenaw and State of Michigan, have invented certain new and useful Improvements in Separating-Machines, of which the following is a specification, reference being had therein to the accompanying drawings.

Figure 1:
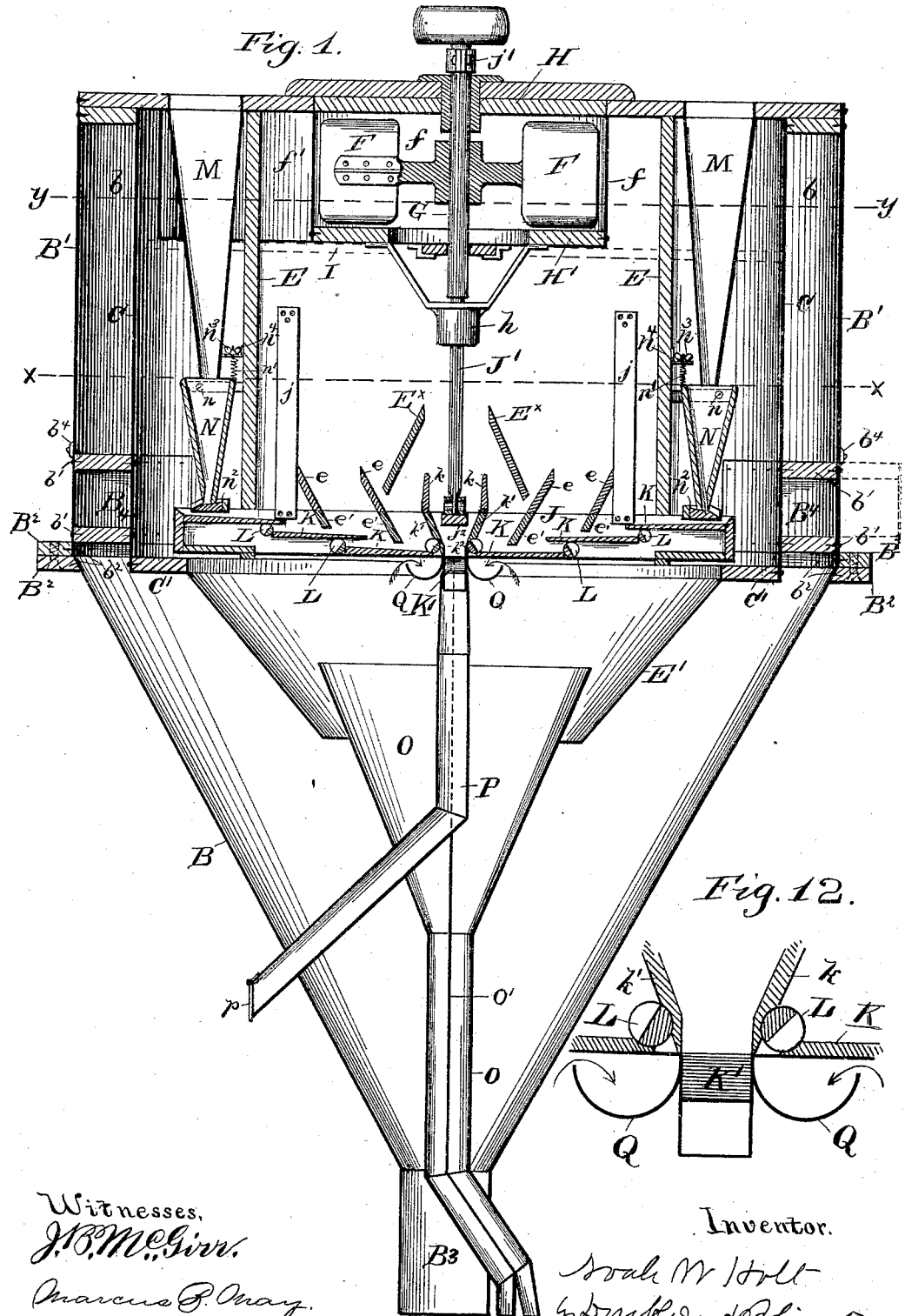
Figure 2:
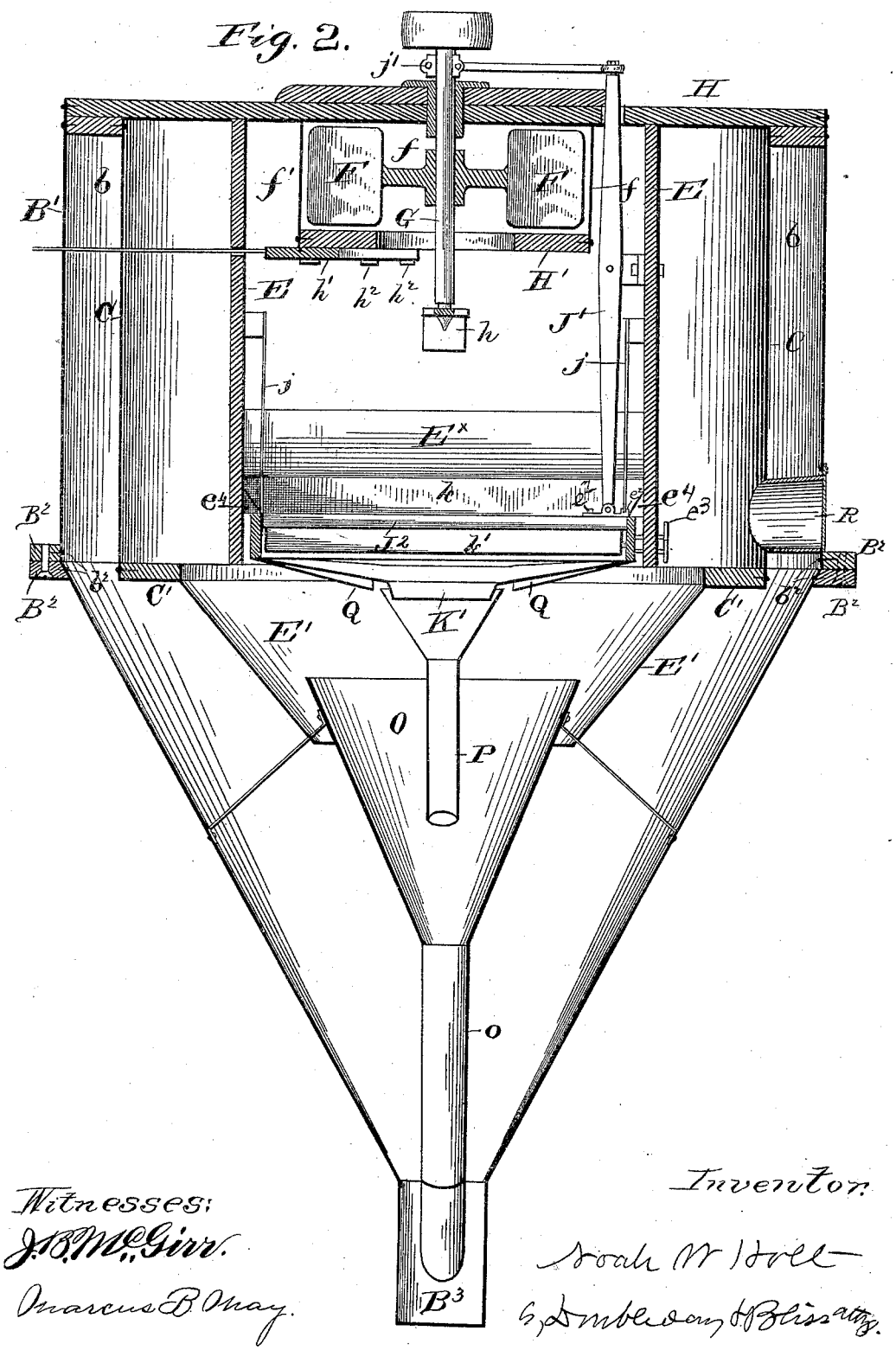
Figure 3:
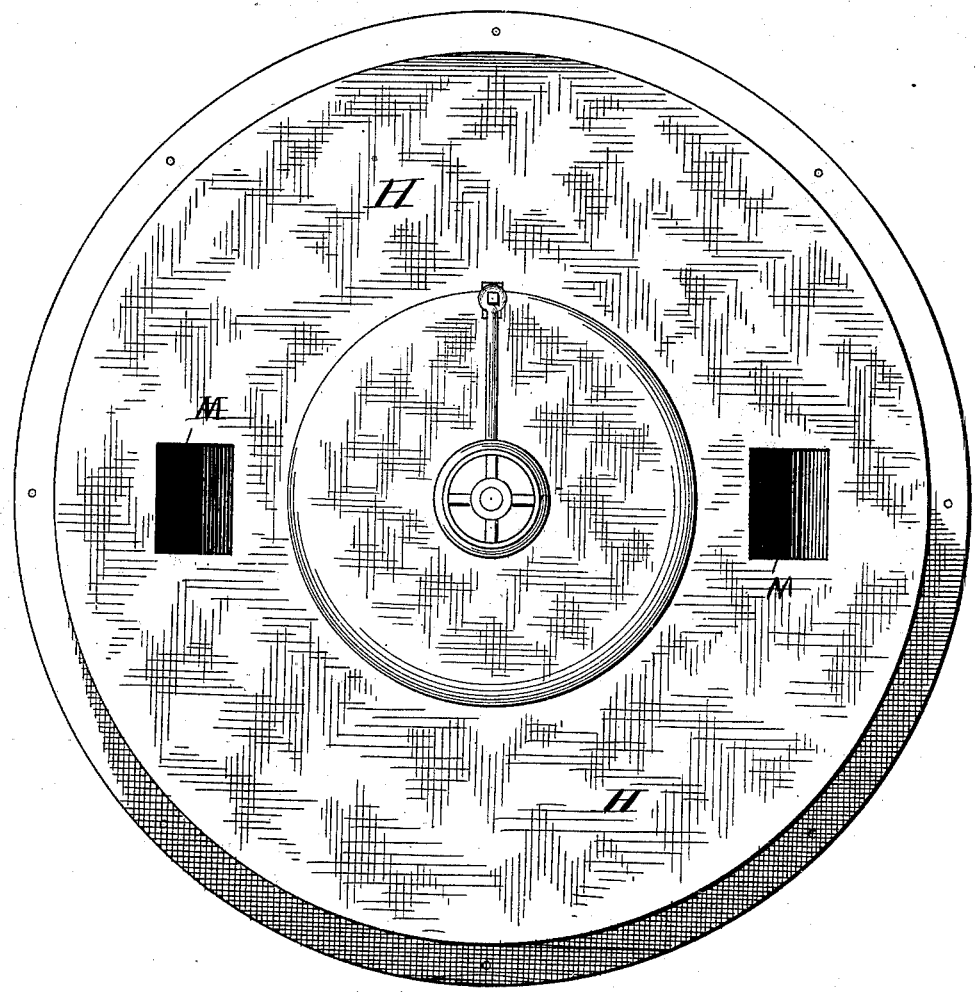
Figure 5:
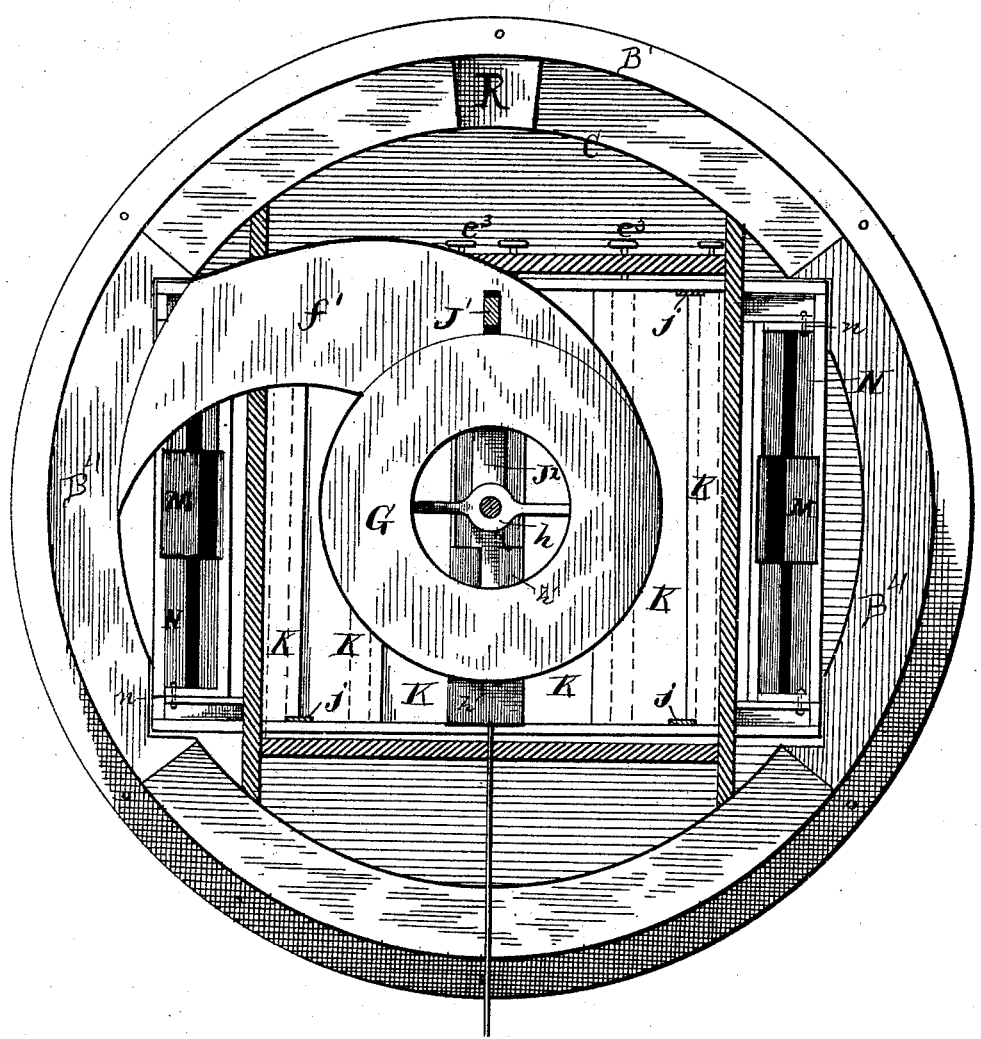
Figure 11:
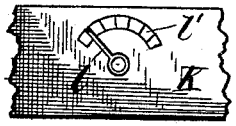

Figure 1 is a central vertical section. Fig. 2 is a central vertical section taken in a plane at right angles to the plane of Fig. 1. Fig. 3 is a top or plan view. Fig. 4 is a horizontal section on line $x\, x$, Fig. 1. Fig. 5 is a horizontal section on line $y\, y$, Fig. 1. Fig. 6 is a detached view in perspective of the door. Fig. 7 is a vertical section of a modification. Fig. 8 is a detached view, enlarged and partly broken away, of one of the valves or dampers. Figs. 9 and 10 are enlarged partial views of modifications of a part of the machine. Fig. 11 is a side view, enlarged, of a portion of the shaker and a device for holding one of the valves in adjustment. Fig. 12 is a detached view, enlarged, showing a small portion of Fig. 1.

Prior to my invention separating-machines had been constructed with a shaker and a dust-collector consisting of a filter-cloth arranged above the shaker and within the air-chamber, through which air-currents passed after moving through the cloth in an upward direction, in order to attain the advantages which are well known to exist in that class of machines wherein the material operated upon is subjected to the vibratory action of a shaker while traversing the surface of a shaker in a comparatively thin sheet extending practically across the entire width of the shaker, so that by the agitation thus produced the finer and lighter impurities are brought to the surface of the layer of material and the mass thereby placed in the best possible condition for the action of an upward-moving air-current. So, also, separating-machines had been operated in which the material had been subjected to the action of an upward-moving air-current while such material was falling or sliding over a series of stationary inclined surfaces, the dust-laden air-current passing from such air-chamber into a surrounding air-chamber.

My invention relates to a machine which shall combine the above-referred-to desirable operation of a shaker with upward-moving air-currents in a comparatively unobstructed exhaust-chamber, so that the movements of the air-currents can be satisfactorily regulated, and the advantages which are found to exist in the separation of the dust from the air by centrifugal action in a chamber which surrounds the exhaust-chamber, whereby an effective separation of material into different grades can be accomplished with but comparatively little such injury to the material as ordinarily results from the treatment to which it is subjected in machines of the usual construction.

Referring to the drawings, B B' is an inclosing shell or casing, of which the lower part B is funnel-shaped, the upper part B' being preferably cylindrical.

C is a guard, preferably circular in cross-section and of uniform diameter throughout, but of less diameter than the shell B' and arranged concentric therewith, so as to form an annular separating-chamber $b$ within the outer casing.

I prefer to make the parts B B' in separate pieces, secured to each other by flanges $B^2\, B^2$, to which the adjacent edges of the shell are attached by pins or screws $b^2$, the flanges being secured to each other by screws or otherwise.

$B^3$ is an outlet-spout at the lower end of the funnel-shaped part B.

$B^4\, B^4$ are doors, consisting, preferably, of suitable frames with sheet-metal coverings projecting at their ends, as indicated at $b^3$, to overlap the adjacent parts of the shell B', which shell is also preferably made of sheet metal, with buttons or other suitable fastenings, as at $b^4$, Fig. 1, to retain the doors in position and make practically air-tight joints around their edges.

E E are the vertical walls of an exhaust-chamber arranged within the guard C and of about the same vertical height. The space between the lower edges of the walls E E and the guard C is closed by a bottom C'.

$E^\times E^\times$ are deflecting-boards in the exhaust-chamber. $e\, e'$ are other wing-boards or deflectors.

E' is a shell, preferably circular in cross-section, and supported below the bottom of the air-chamber, preferably, by means of the bottom or plate C'.

F F are the blades of the fan mounted on shaft G, the upper end of which is supported in a suitable bearing attached to the casing H of the machine, its lower end being mounted in a bearing or step $h$, suspended from the lower head H' of the fan-case. The shell $f\,f'$ of the fan opens into the separating-chamber $b$.

I prefer to extend the walls E E of the exhaust-chamber upward to the deck H, with the mouth of the fan projecting through one of these walls; but under some circumstances I may employ a partition, as indicated in dotted lines at I, Fig. 1, in which case the lower fan-head might be omitted, the bearing or step $h$ being supported from the partition.

J represents, generally, a shaker supported from the walls of the air-chamber by hangers or links $j\,j$, with both its ends preferably projecting under or through opposite walls of the chamber.

J' is a vibrating lever pivoted to the wall of the exhaust-chamber and connected at its upper end by a link or arm $j'$ to a cam or crank on the fan-shaft G, so that a vibrating motion is imparted to the shaker when the fan-shaft is running.

K K are a series of plates or shelves mounted in the shaker and vibrating with it. There is a throat or air-passage between one edge of each plate and the adjacent edge of another plate, the plates being arranged either in horizontal position or slightly inclined downward from their receiving-edges to their discharging-edges.

L L are dampers of any usual or approved sort, arranged in such relation to the throats that they can be used to regulate the strength of air-currents drawn up through the throats by the fan. By preference I journal these valves in the shoe and provide each with a locking device or holding device of some sort—such, for instance, as a lever $l$ taking into a notched rack or plate $l'$,—attached to the side of the shoe, (see Fig. 11)—and with hand-wheels or levers $e^3\,e^3$ outside of the air-chamber, by which the positions of the valves may be regulated and the valves held in position. As shown in Fig. 2, there are overlapping flanges or ribs $e^4$ attached to the inner walls of the air-chamber just above the upper edges of the sides of the shaker to perform the double function of preventing the air from passing up between the sides of the shoe and the walls and to return to the shaker any material which may fall upon the ribs, the upper faces of which are inclined for the latter purpose. The hangers may be connected at their upper and lower ends, respectively, to the walls of the chamber and the shaker in any convenient way.

J² is a girt mounted at its ends in or upon the sides of the shoe, with a bracket $e^2$ secured at one end, and by preference slotted to receive the lower end of the vibrating lever, which is pivoted to it. (See Fig. 2.) There are two sets of shelves with an open space between the inner edges of the inner pair, at which point there is a downward-projecting spout K', attached by its upper end to the edges of the shelves. The parts $e'$ of the deflectors are carried by the shaker.

$k\,k'$ represent eddy-boards, of which the upper sections $k$ are movable, so that their inclination toward or from a vertical line may be adjusted. The lower edges of the parts $k'$ extend down to the spout K', with throats $k^2$ between the spout and the adjacent edges of the shelves. As shown, I prefer to arrange dampers or valves above the shelves at these points, and to recess longitudinally the lower portions of the eddy-boards to fit the curved outer faces of the valves.

The construction of the valves is shown in detail in Fig. 8, from an examination of which it will be seen that because of the curved outer faces being concentric to their spindles they may be rotated without being moved out of contact with the eddy-boards or with the ends of the shelves against which they abut. Therefore the valves may be so adjusted as to admit air between their lower edges and the adjacent inner ends of the inner shelves and form with the adjacent partitions stops to receive the material flowing over those shelves and direct the same, or part thereof, through the throats. So, also, air may pass between the upper edges of the other valves and the adjacent under sides of the shelves, while the curved faces of the valves serve as stops to insure that no material shall pass over the outer ends of the second or third shelves, counting from opposite ends of the shaker.

M M are feed-spouts projecting downward from the deck into the upper open sides of hoppers N N, each pivoted, by preference, eccentrically, as at $n\,n$.

$n'\,n'$ are adjustable springs attached to the inner walls of the hoppers in such manner that their lower open edges can yield and swing outward as the material within the hoppers accumulates and increases in weight.

$n^2\,n^2$ are feed-boards attached to the shoe, and, by preference curved on their upper faces in arcs of circles, of which the pivots $n$ are centers, so that the inner board of each hopper can swing out and in without moving away from those curved upper faces; but the outer board of each hopper will swing away from the outer edges of these boards, (which are preferably beveled, as in Fig. 1,) thus increasing the width of the feed-throats according to the weight of material within the hoppers, as will be readily understood. Of course the tension of the springs $n'$ can be regulated by the screw stems or shanks $n^3$, which connect the springs with the brackets or lugs $n^4$, attached to the wall of the air-chamber. By an examination of Fig. 1 it will be readily understood that these feeding devices are located in a practically-inclosed dead-air chamber, of which the guard C and the walls E E form, respectively, the inner and outer vertical walls, thus insuring that the material fed in shall not be disturbed or interfered with by a current of air passing through such dead-air chamber.

O is a funnel-shaped hopper arranged to receive material which passes through the shell E'. By preference I divide this funnel-shaped hopper and the spout $o$ by a central partition O', so that material may be divided or kept from intermingling and may be delivered through two separate outlets $o^2$ $o^3$.

P is a tailings-spout communicating at its upper end with the downward-projecting spout K'.

Q Q are inclined troughs carried by the shoes and arranged below the inner edges of the inner shelves of the series to receive material passing over the shelves and conduct it inward toward and into the hopper O whenever the width of the shoe (or length of the shelves) makes it desirable, in order to insure a proper discharge from the machine of the material which passes over the shelves. It is desirable, in order to attain the best results, that there should be considerable space between the upper end of the hopper O in continuation of the discharge-spout $o$ and the lower side of the shaker for a free movement of the air-currents, and that there be a shell E' to prevent such air-currents from being disturbed by the movement of the gyrating current or vortex within the funnel-shaped lower part B of the casing.

This machine may be operated as follows: Material being fed in through one or both of the feed-spouts M will accumulate in one or both hoppers N until its weight so increases as to force its way out and on to the shoe. As it passes over the shelves the fan draws a current of air up between the shelves, taking with it the lighter portions of the material and discharging the dust-laden air-current through the mouth of the fan into the separating-chamber, where it forms a vortex, and such material is by centrifugal action separated from the air and is discharged out of the machine at its lower end. The air after being thus freed from such material travels over the upper edge of the funnel-shaped hopper O and under the lower edge of the shell E', and thence again through the throats of the shoe. Thus it travels round and round again through the machine. I prefer to use so strong an air-current at the inner edges of the inner shelves that heavier material will be taken up, and as it passes above the upper edges of the eddy-boards $k$ $k'$ part of such heavier material will fall between and inside of those boards and thence out through the tailings-spout P, it being well understood that by reason of the presence of those eddy-boards there will be a sort of eddy-chamber above them, through which some of the heavier portions will fall by their own specific gravity. By adjusting the position of the upper edges of these partition-boards the proportion of material which will thus fall back may be regulated with a good deal of accuracy, and while I prefer to make each of these partitions in two sections with the upper one adjustable I do not wish to be limited to such construction, because some of the advantages of this part of my invention may be attained by making each eddy-board in a continuous piece rigidly fixed in position, as indicated in Fig. 9, or by making each eddy-board in a single adjustable piece, as indicated, for instance, in Fig. 10. The material thus taken out by the air-currents and discharged through the tailings-spout P may be subjected to such further treatment as may be found desirable.

The material delivered through one of the feed-spouts M may differ in character, particularly as regards its coarseness, from that which is fed in through the other feed-spout, and the strength of the air-current to which each of such differing grades is subjected can be of course regulated by the valves. This capability of treating in the same machine material fed to one end of the shaker differing considerably in size of granulation from material delivered to the other end of the shaker is of course greatly facilitated by the use of separately-adjustable valves and is very desirable in connection with the present system of gradual reduction employed in many mills, because, among other things, it enables the operator to separate from two lots of material which differ quite radically such portions as can be advantageously sent to a purifier without further reduction and in the same machine collect from such differing material such parts thereof as require further reduction In case it be found desirable to feed material through only one of the feed-hoppers, the machine can be advantageously operated in that way, because, among other things, the valves on the opposite side of the machine can be entirely closed and the spring of the opposite hopper will draw the lower edges of both sides of the hopper over and into close contact with the curved upper face of the adjacent feed-spout, so as to practically prevent the fan from drawing any air into the machine at that point, and the joint between the feed-spout and the top of the hopper may be made so tight that there will be no objectionable inflow of air at that point.

In the modification shown in Fig. 7 but one shoe is used, having a series of shelves adapted to flow material from a hopper at one end of the shoe across its entire length instead of receiving material at both ends and discharging it midway of its length, as in the other figures. In this modification there is also a chute or inclined trough Q at the discharging end of the shaker, with a single tailings-spout and an eddy-board similar to the partitions $k$ $k'$. All of the discharge-spouts may have at their lower ends trap-valves, like that at $p$, Fig. 1, to prevent the flow of air-currents. R, Figs. 2, 4, and 5, is a hand-hole through the outer casing and the guard C, through which the operator can reach to regulate the valves. It will be seen that the doors $B^4$ are about on a level with the shakers, so that when the doors are removed the shoes can be taken out or put in, as may be required, first, of course, removing the hoppers and uncoupling the hangers and the vibrating levers from the shoes.

While I prefer to use a valve or damper $h'$ sliding across the eye of the fan in ways or cleats $h^3 h^2$, attached to the lower fan-head, to place the strength of the air-current more effectually under the control of the operator, yet I do not wish to be limited thereby. So, also, while I prefer to use shelves of some imperforate material in the construction of the shaker, yet I propose under some circumstances to use bolting-cloth or other finely-reticulated material for that purpose, in order to facilitate the separation of material—particularly the lighter impurities—from the other parts of the mass which is fed into the machine.

I do not wish to claim in this application, broadly, the combination of a centrifugal dust-collector with a shaker arranged over the air-outlet of the dust-collector and an exhaust-chamber over the shaker, as that invention forms the subject-matter of an application for patent filed by me October 30, 1889, Serial No. 328,635.

What I claim is—

1. In a separating-machine, the combination of an inclosing-shell forming a separating-chamber, means whereby air is caused to rotate within the separating-chamber, an exhaust chamber within the separating-chamber, and a shaker arranged at the lower part of the exhaust-chamber, substantially as set forth.

2. In a separating-machine, the combination of an inclosing-shell forming a separating-chamber, means whereby air is caused to rotate within the separating-chamber, an exhaust-chamber within the separating-chamber, a shaker arranged at the lower part of the exhaust-chamber and projecting at one end beyond the exhaust-chamber, and a feeder adapted to deliver material to the projecting end of the shaker, substantially as set forth.

3. In a separating-machine, the combination of an inclosing-shell forming a separating-chamber, means whereby air is caused to rotate within the separating-chamber, an exhaust-chamber within the separating-chamber, a shaker arranged at the lower part of the exhaust-chamber, and the guard between the exhaust-chamber and the inclosing-casing, substantially as set forth.

4. In a separating-machine, the combination of an inclosing-shell forming a separating-chamber, means whereby air is caused to rotate within the separating-chamber, an exhaust-chamber within the separating-chamber, and a shaker arranged at the lower part of the exhaust-chamber and provided with a series of shelves having throats between them for the passage of air-currents, substantially as set forth.

5. In a separating-machine, the combination of an inclosing shell forming a separating-chamber, means whereby air is caused to rotate within the separating-chamber, an exhaust-chamber within the separating-chamber, and a floor which closes the space between the lower portions of the exhaust-chamber and the guard, whereby there is formed a a dead-air chamber within the separating-chamber, substantially as set forth.

6. In a separating-machine, the combination of an inclosing-shell forming a separating-chamber, means whereby air is caused to rotate within the separating-chamber, an exhaust-chamber within the separating-chamber, a dead-air chamber, a shaker arranged at the lower part of the exhaust-chamber and projecting into the dead-air chamber, and a feeder within the dead-air chamber, substantially as set forth.

7. In a separating-machine, the combination, with the exhaust-chamber, of the shaker arranged at the lower part of the exhaust-chamber and having a series of overlapping shelves arranged to form a series of throats extending across the shaker for the passage of air, and a series of separately-adjustable valves arranged transversely to the flow of material over the shaker, whereby the material as it traverses the shaker may be subjected to air-currents of increasing strength from the receiving part of the shaker to the discharging part, substantially as set forth.

8. In a separating-machine, the combination, with the exhaust-chamber, of the shaker arranged at the lower part of the exhaust-chamber and having a series of overlapping shelves arranged to form a series of throats extending across the shaker for the passage of air, and a series of separately-adjustable valves mounted upon and carried by the shaker, the valves being arranged in substantially horizontal planes with their respective throats, substantially as set forth.

9. In a separating-machine, the combination, with the exhaust-chamber, of the shaker arranged at the lower part of the exhaust-chamber, and having a series of overlapping shelves arranged to form a series of throats extending across the shaker for the passage of air, and a series of separately-adjustable valves, each arranged parallel with one of the throats and in contact with the shelf which forms the lower wall of such throat, substantially as set forth.

10. In a separating-machine, the combination, with the exhaust-chamber, of the shaker arranged at the lower part of the exhaust-chamber, a conduit to receive tailings which pass over the discharging end of the shaker, a fan connected with the exhaust-chamber to receive a dust-laden air-current, an eddy-board adapted to deflect part of the material taken up by the air-current, whereby the heavier portion of such material is discharged through the conduit with the tailings, a conduit to receive material which passes over the shaker but is not delivered to the tailings-conduit, and a valve to regulate the strength of the air-current which passes upward between the eddy-board and the adjacent part of the shaker, substantially as set forth.

11. In a separating-machine, the combination, with the separating-chamber and the exhaust-chamber, of a shaker suspended at the lower part of the exhaust-chamber, the tailings-spout, the spout below the chamber, and a trough adapted to receive material from the shaker and discharge it into the spout, substantially as set forth.

12. In a separating-machine, the combination, with the separating-chamber and the exhaust-chamber, of a shaker suspended at the lower part of the exhaust-chamber, the tailings-spout, the spout below the shaker, and the eddy-boards, substantially as set forth.

13. In a separating-machine, the combination, with the separating-chamber and the exhaust-chamber, of a shaker suspended at the lower part of the exhaust-chamber, the shell E', the tailings-spout, the spout below the shaker, and the eddy-boards, substantially as set forth.

In testimony whereof I affix my signature in presence of two witnesses.

NOAH W. HOLT.

Witnesses:
A. F. FREEMAN,
W. L. WATKINS.